United States Patent [19] | [11] 3,737,872
Soule, Jr. et al. | [45] June 5, 1973

[54] PLUGBOARD SELECTION OF ORDINAL LIMITS OF REGISTER READOUT

[75] Inventors: Winsor Soule, Jr., Berkeley; Leif Andreasen, Newark, both of Calif.

[73] Assignee: SCM Corporation, New York, N.Y.

[22] Filed: Mar. 2, 1970

[21] Appl. No.: 24,904

Related U.S. Application Data

[62] Division of Ser. No. 434,265, Feb. 23, 1965, Pat. No. 3,522,416.

[52] U.S. Cl. ....................340/172.5
[51] Int. Cl. ....................G06f 9/02, G06f 15/00
[58] Field of Search ....................340/172.5; 197/20; 235/61.6

[56] References Cited

UNITED STATES PATENTS

| | | | |
|---|---|---|---|
| 2,702,380 | 2/1955 | Brustman | 340/172.5 |
| 3,142,042 | 7/1964 | Te-An Ling | 340/172.5 |
| 3,025,941 | 3/1962 | Blodgett et al. | 197/20 |
| 3,000,555 | 9/1961 | Innes | 235/61.6 |
| 2,905,299 | 9/1959 | Hildebrandt | 197/20 |

*Primary Examiner*—Gareth D. Shaw
*Assistant Examiner*—John P. Vanderburg
*Attorney*—Armand G. Guibert

[57] ABSTRACT

Designation of the start and end of readout of a register's contents by use of a plugboard in conjunction with the usual digit position identification signals, together with instructions on program media for selection of alternate designations.

22 Claims, 2 Drawing Figures

PLUGBOARD SELECTION OF ORDINAL LIMITS OF REGISTER READOUT

This is a division of application Ser. No. 434,265, now U.S. Pat. No. 3,522,416, filed Feb. 23, 1965, by Winsor Soule, Jr. et al. and entitled "Input-Output Controls".

The particular invention claimed herein relates to output controls for electronic digital computers, particularly those of the externally programmed type in which operating instructions and data are stored in record media such as punched paper tape.

The novelty of the system disclosed in the parent patent is that the externally programmed computer instructions on the punched paper tape are variable-length series of coded characters (referred to hereinafter as instruction words) presented serially in character-by-character an operation — including those of an algebraic nature an address, or an output format selection. The output format selection characters are not conclusive, being subject to modification by variable arrangements of the patchcords on a plugboard forming part of the program controls.

Specifically, one features claimed herein relates to provision of an output sub-routine which calls for internally reading all characters in a register, but providing only a partial output as controlled by plugboard designation of the start, decimal and stop positions of recording information. There is also provision for selecting an alternate determination of the start, decimal, and stop positions according to the sensing of a selection character on the program medium. A further feature of the invention is that the above-mentioned subroutine includes provision for producing, also under control of the plugboard, one or two symbols with proper regard to the sign of the register contents. Greater flexibility without sacrifice of simplicity is achieved through use of the plugboard, together with an already present digit counter, for controlling this function.

SUMMARY OF THE INVENTION

The invention claimed herein provides in a computer having a character-by-character readout, a means for internally reading all the characters in a register, but providing selectable partial outputs according to the program in a plugboard and effected through use of the usual signals identifying the digit positions of the computer register.

Further, another embodiment of the invention provides two plugboard output programs alternatively effective according to the sensing of a selection character in the external program of the computer.

BRIEF DESCRIPTION OF THE APPENDED DRAWING

Figure 16:
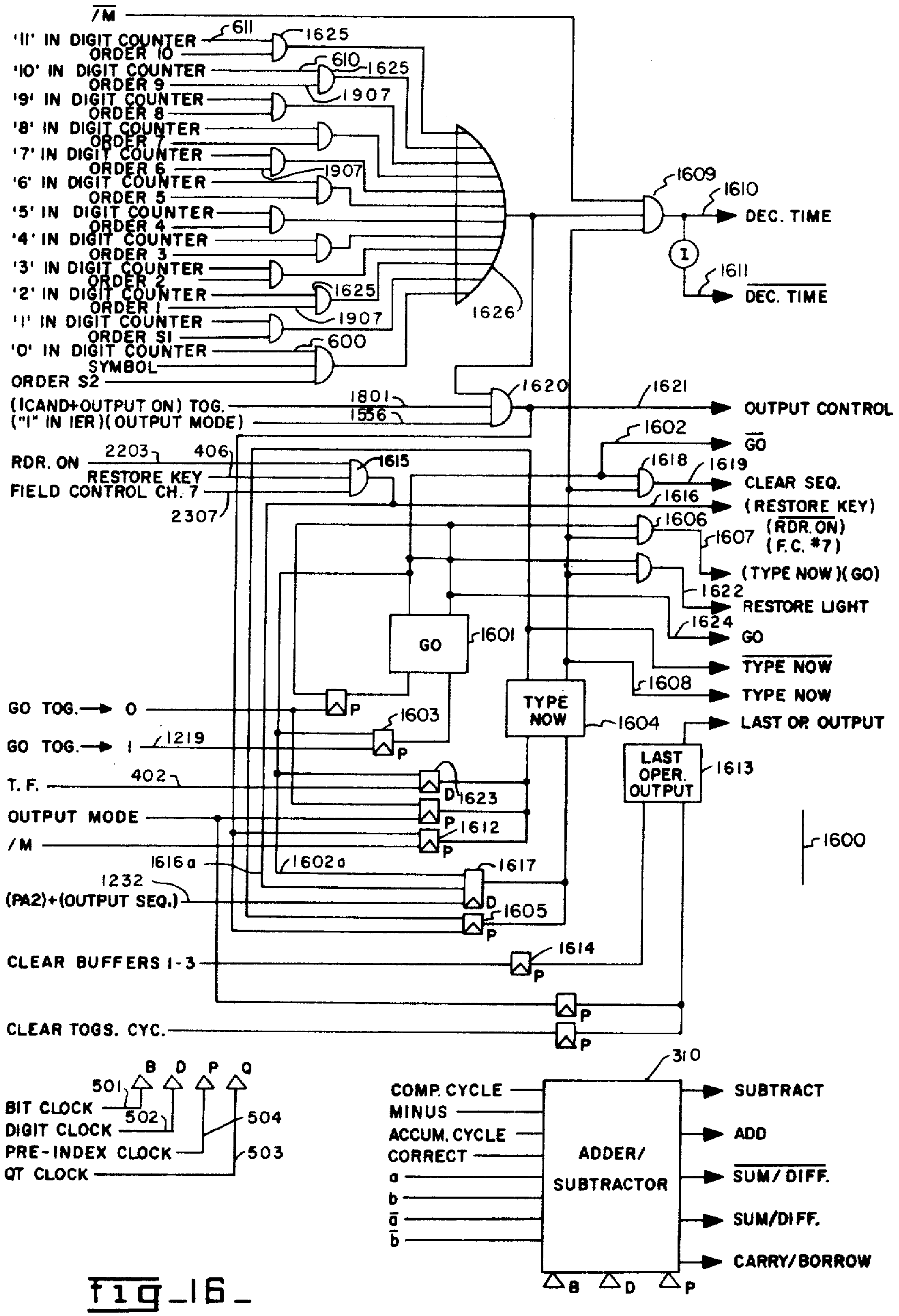
Figure 19A:
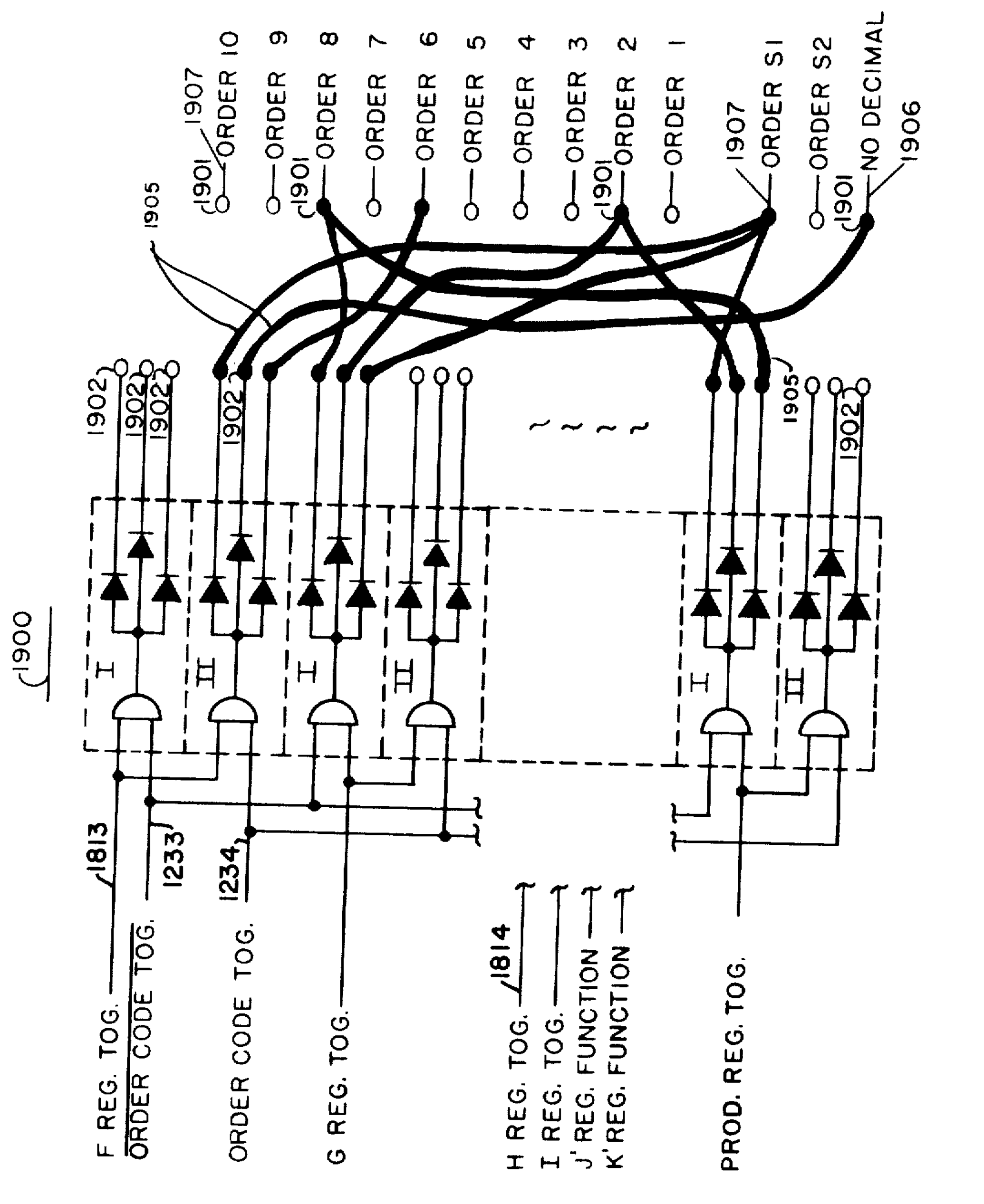

FIG. 16 — a logic diagram of the toggles that control the input-output sequencing and a block diagram of the arithmetic unit — the adder/subtractor — with the inputs it requires and the outputs it generates; and FIG. **19*a*** — a combined logic and circuit diagram showing some circuit elements of the output control plugboard, including sample wiring, for providing two formats of output.

DISCLOSURE OF THE INVENTION

The drawings and description of the parent Patent, No. 3,522,416 are incorporated by reference. The essential material therein which applies to present claims includes at least FIGS. 1, 3, **11*a*, 12 through 18, 19*a*, 20 and 24*a–d***, together with the detailed description of output, Col. 19, line 50 through Col. 26, line 17.

We claim:

1. In a digital computer having a plural order register for storing digits in each order, and normally disabled means for reading out the contents of said register sequentially, the combination of:

- a counter arranged to give a discrete count for each order of the register;
- circuit means for representing the various orders in said register, said circuit means comprising a plurality of control lines corresponding in number to the number of register orders and each said line being identifiable with a discrete one of said orders;
- a source of electrical potential;
- manual means for connecting at least a pair of said control lines to said source of potential; and
- means for providing an enabling signal to said normally disabled read-out means in response to the presence of said potential on a first connected one of said pair of lines and the advance of the counter to a first count related to the order identified with said first line, and for removing said enabling signal in response to the presence of said potential on the other of said pair of lines and the advance of the counter to another count related to the order identified with said other line.

2. A digital computer as defined in claim 1, wherein the manual connecting means is a plugboard.

3. A digital computer as defined in claim 1 wherein the readout enabling means is a bi-stable element and one of said connections defines the register order for start of readout and the other of said connections defines the register order for termination of readout by controlling the setting of said bi-stable element to a first state and resetting to a second state, respectively.

4. A digital computer as defined in claim 3 wherein the counter operates in a count down fashion, and the connection to the signal line representing the higher register order and the connection to the signal line representing the lower register order automatically define, respectively, the register orders for start and termination of readout.

5. A computer as defined in claim 1, further including an additional counter, said counter being normally inactive;

- means responsive to a particular count in said first-mentioned counter to render said additional counter active;
- means responsive to a first count in said additional counter for providing a discrete output.

6. A computer as defined in claim 5, further including means indicating a negative sign for the register digits;

- additional output means responsive to said first count in said additional counter and to said negative sign indicating means for providing a second discrete output.

7. A computer as defined in claim 5, further including

- second output means responsive to a second count in said additional counter for providing a third discrete output.

8. A computer as defined in claim 7, further including means indicating a negative sign for the register digits;

third output means responsive to said second count in said additional counter for providing a fourth discrete output.

9. In a digital computer having a plural order register for storing digits in each order, and an output device, the combination of:

normally disabled means for reading the contents of said register sequentially;

a counter arranged to give a discrete count for each order of the register;

a timing source providing a pulse at least once for each scanning of said register;

a single digit buffer register connected to said normally disabled reading means;

means for enabling said reading means in response to a particular count in said counter;

circuit means for representing the various orders in said register, said circuit means comprising a plurality of control lines corresponding in number to the number of register orders and each said line being identifiable with a discrete one of said orders;

a source of electrical potential;

manual means for connecting at least a pair of said control lines to said source of potential;

normally disabled means for transmitting the digit in said buffer register to said output device in response to a pulse from said timing source;

means to enable said transmitting means in response jointly to the presence of said potential on a first connected one of said lines and the advance of the counter to a first count related to the order identified with said first line; and means for disabling said transmitting means in response jointly to the presence of said potential on the other of said pair of lines and the advance of the counter to a count related to the order identified with said other line.

10. In a data processing system comprising a digital computer having a plurality of registers storing digits in each order, and an output device, the combination of normally disabled means for readlng the contents of said registers sequentially;

means to select individual registers for readout;

a counter arranged to give a discrete count for each order of the register;

a timing source providing a pulse at least once for each scanning of said register;

a single digit buffer register connected to said normally-disabled reading means;

means for enabling said reading means in response to a particular count in said counter, and to said register selection means;

circuit means for representing the various orders in each said register, said circuit means comprising a plurality of signal lines corresponding in number to the number of register orders;

a source of electrical potential;

means responsive to a particular register selection for supplying said potential to a respective pair of terminals;

manual means for isolated connection of a pair of said signal lines to said pair of terminals; and means for transmitting the digit in said buffer register to said output device in response jointly to the presence of said potential on a connected one of said lines, the advance of the counter to the corresponding count, and the occurrence of said pulse from said timing source.

11. A data processing system as defined in claim 10 wherein said selective potential supply means comprise a plurality of And gates, each responsive to a respective register selection.

12. A data processing system as defined in claim 10, further including an additional counter, said counter being normally inactive;

means responsive to a particular count in siid first-mentioned counter to render said additional counter active;

means responsive to a first count in said additional counter for providing a discrete output.

13. A data processing system as defined in claim 12, further including means indicating a negative sign for the register digits;

additional output means responsive to said first count in said additional counter and to said negative sign indicating means for providing a second discrete output.

14. A data processing system as defined in claim 12 further including second output means responsive to a second count in said additional counter for providing a third discrete output.

15. A data processing system as defined in claim 14 further including means indicating a negative sign for the register digits;

third output means responsive o said second count in said additional counter for providing a fourth discrete output.

16. In a data processing system having at least one plural order storage register, an output device, and normally disabled means for reading out the concents of said register to the output device, the combination of:

a counter arranged to give a discrete count for each register order;

circuit means for representing the various orders, comprising a plurality of signal lines, equal in number to the number of register orders and each being representative of a particular order;

a source of electrical potential;

manual means for isolated connection of at least a pair of said signal lines to said source of potential, said connections each defining a different order for start of readout;

program means;

first and second readout instructions in said program means;

means for sensing said instructions;

means for providing an enabling signal to the readout means jointly in response to the presence of said potential on one of said pair of lines, the sensing of said first readout instruction in the program means, and the advance of counter to the count corresponding to the order represented by said one line, and alternatively in response to the presence of said potential on the other of said pair of lines, the sensing of said second instruction in said program device, and the advance of the counter to the count corresponding to the order represented by the other of said pair of lines.

17. A data processing system as defined in claim 16 wherein two sets of line pairs are manually connectable to said source of potential, each line pair set defining a different combination of orders for start and termination of the readout.

18. A data processing system as in claim 17, and further including a bi-stable element normally in a first state and settable to a second state in response to the sensing of said second readout instruction in said program device, the start and termination of readout occurring according to the selections afforded by one set of said connected line pairs when the bi-stable element is in its first state, and according to the selection afforded by the other set of said connected line pairs when the bistable element is in its second state.

19. In a digital computer having a plural order register for storing digits in each order, and normally disabled means for reading out the contents of said register sequentially, the combination of:

a counter arranged to give a discrete count for each order of the register;

circuit means for representing the various orders in said register, said circuit means comprising a plurality of control lines corresponding in number to the number of register orders and each said line being identifiable with a discrete one of said orders;

a source of electrical potential;

manual means for connecting a pair of said control lines to said source of potential; and means for providing an enabling signal to said normally disabled readout means in response to the presence of said potential on a first connected one of said pair of lines and the advance of the counter to a first count related to the order identified with said first line, and means independent of said register contents and defining the location of a decimal point in the number read out of said register, and operative in response to the presence of said potential on the other of said pair of lines and the advance of the counter to another count related to the order identified with said other line.

20. In a digital computer having a plurality of plural-order registers for storing digits in each order, normally disabled means for reading out the contents of a selected one of said registers sequentially, and means to select each register for readout, the combination of:

a counter arranged to give a discrete count for each order of said registers, said counter operating in a countdown fashion;

circuit means for representing the various orders in said register, said circuit means comprising a plurality of control lines corresponding in number to the number of register orders and each said line being identifiable with a discrete one of said orders;

a source of electrical potential;

a plurality of gates, each having an output and responsive to selection of a respective register for supplying said potential at said output;

manual means for isolated connection of at least a pair of said control lines for each register to the output of a respective gate;

a bi-stable element having first and second states, said element being settable to said first state in response to the presence of said potential on a first one of said connected lines identified with a particular order and the presence of a count in the counter relate to said particular order, and being resettable to said second state in response to the presence of said potential on the other of said pair of lines, said other line being identified with an order lower than said particular order, and the presence in the counter of a count related to the lower order; and means enabling said normally disabled readout means in response to the first state of said bi-stable element.

21. In a digital computer having a plural-order register for storing digits in each order, normally disabled means for reading out the contents of said register sequentially, the combination of:

a counter arranged to give a discrete output for each order of said register, said counter operating in a countdown fashion;

circuit means for representing the various orders in said register, said circuit means comprising a plurality of control lines corresponding in number to the number of register orders and each said line being identifiable with a discrete one of said orders;

a source of electrical potential;

a plurality of AND gates, each having an output and having inputs connected to corresponding ones of said counter outputs and said control lines;

manual means for connecting at least a triad of said control lines to said source of potential, comprising connection of a first control line identified with a particular register order, a second control line identified with a register order lower than said particular order, and a third control line indentified with a register order intermediate those identified with said first and second control lines;

a first bi-stable element settable to a first state in response to the presence of said potential on said first line and the presence in the counter of a count related to said order;

means enabling said normally disabled readout means in response to the first state of said bi-stable element;

a second bi-stable element, normally set in a first state;

means for producing a discrete output signal in response jointly to the appearance of a signal at the output of said AND gate having said third control line as an input, and to the first state of said first and second bi-stable elements;

means for setting said second bi-stable element to the second state in response jointly to said discrete output signal and said first state of said first bi-stable element; and means for resetting said first bi-stable element to said second state, in response jointly to the appearance of a signal on the output of said AND gate having as one input the lower-ordered one of said pair of control lines, and to the second state of said second bi-stable element.

22. A digital computer as claimed in claim 21, wherein the connection of said third control line to said source of potential enables means independent of said register contents and defining the location of a decimal point in the number read out of said register.

* * * * *